(12) United States Patent
Sullivan (10) Patent No.: US 10,034,464 B2
(45) Date of Patent: Jul. 31, 2018

(54) FISH HARVESTING HEAD WITH ARM RETRACTION SYSTEM

(71) Applicant: Kevin M. Sullivan, Lakemont, GA (US)

(72) Inventor: Kevin M. Sullivan, Lakemont, GA (US)

(*) Notice: Subject to any disclaimer, the term of this patent is extended or adjusted under 35 U.S.C. 154(b) by 77 days.

(21) Appl. No.: 15/374,559

(22) Filed: Dec. 9, 2016

(65) Prior Publication Data

US 2017/0172123 A1 Jun. 22, 2017

Related U.S. Application Data

(60) Provisional application No. 62/270,380, filed on Dec. 21, 2015.

(51) Int. Cl.
*A01K 81/04* (2006.01)
*F42B 6/08* (2006.01)

(52) U.S. Cl.
CPC .............. *A01K 81/04* (2013.01); *F42B 6/08* (2013.01)

(58) Field of Classification Search
CPC .............. A01K 81/04; F42B 6/08; F42B 6/02
See application file for complete search history.

(56) References Cited

U.S. PATENT DOCUMENTS

| | | | |
|---|---|---|---|
| 3,036,395 A * | 5/1962 | Nelson | F42B 30/14 43/6 |
| 4,742,637 A | 5/1988 | Musacchia | |
| 4,819,360 A * | 4/1989 | Thomas | A01K 81/04 43/6 |
| 4,901,467 A * | 2/1990 | Stolpe | A01K 81/04 124/79 |
| 6,287,223 B1 * | 9/2001 | Liechty, II | F42B 6/08 473/583 |
| 9,146,085 B1 * | 9/2015 | Braun | F42B 6/08 |
| 9,329,006 B1 * | 5/2016 | Hansen | F42B 6/08 |
| 9,723,820 B2 * | 8/2017 | Harshberger | A01K 81/04 |
| 2006/0084535 A1 * | 4/2006 | Kuhn | F42B 6/08 473/583 |
| 2006/0154757 A1 * | 7/2006 | Sullivan | F42B 6/08 473/582 |
| 2007/0161438 A1 * | 7/2007 | Fulton | F42B 6/08 473/583 |
| 2009/0100738 A1 * | 4/2009 | Sullivan | A01K 81/04 43/6 |

(Continued)

*Primary Examiner* — Christopher P Ellis
(74) *Attorney, Agent, or Firm* — Akerman LLP; Michael K. Dixon (57) ABSTRACT

A fish harvesting head is disclosed having one or more barb arms protruding from barb receiving slots in a harvesting body and having an arm retraction system configured to withdraw the barb arms toward the harvesting body for removal of the fish harvesting head from a body. The arm retraction system is configured to allow the barb arms to move between a shooting barb position and a fish retaining barb position. The arm retraction system may also be activated to retain the barb arms against the harvesting body of the fish harvesting head in a fish harvesting head release position, which enables the fish harvesting head to be easily pulled back through a body, such as a fish, after it has been shot. The barb arms may be held in the fish harvesting head release position while all components, including a pierce tip, remain attached to the fish harvesting head.

20 Claims, 12 Drawing Sheets

(56) References Cited

U.S. PATENT DOCUMENTS

| | | | |
|---|---|---|---|
| 2009/0124439 A1* | 5/2009 | Sullivan | F42B 6/08 473/584 |
| 2011/0165977 A1* | 7/2011 | Adams | F42B 6/08 473/583 |
| 2014/0128186 A1* | 5/2014 | Treto | F42B 6/08 473/583 |
| 2014/0155202 A1* | 6/2014 | Young | F42B 6/08 473/583 |
| 2014/0179467 A1* | 6/2014 | Pedersen | F42B 6/08 473/583 |
| 2014/0194235 A1* | 7/2014 | Pedersen | F42B 6/08 473/584 |
| 2015/0065279 A1* | 3/2015 | La See | F42B 6/08 473/584 |
| 2015/0168112 A1* | 6/2015 | Hollars | F42B 12/34 473/583 |
| 2015/0184986 A1* | 7/2015 | Franco, Sr. | F42B 6/08 473/577 |
| 2016/0146582 A1* | 5/2016 | Razmus, II | F42B 6/08 473/585 |
| 2017/0089676 A1* | 3/2017 | Hand | F42B 6/08 |
| 2017/0122712 A1* | 5/2017 | Hahn | F42B 6/08 |

* cited by examiner

FISH HARVESTING HEAD WITH ARM RETRACTION SYSTEM

CROSS REFERENCE TO RELATED APPLICATION

This application claims the benefit of U.S. Provisional Patent Application No. 62/270,380, filed on Dec. 21, 2015.

FIELD OF THE INVENTION

This invention is directed generally to fish harvesting systems, and more particularly to tips such as arrowheads usable for bowfishing and spearfishing tips.

BACKGROUND

Bowfishing equipment has been used throughout the years to successfully harvest fish of all varieties. Typically, an arrow used for bowfishing includes an arrowhead with a barb for keeping the fish attached to the arrow once shot. One such example is disclosed in U.S. Pat. No. 4,742,637. The '637 patent discloses a bowfishing arrowhead formed from a tip with a rotatable barb. The rotatable barb is confined in a hole in the arrowhead and is not removable. The bowfishing head of the '637 patent also includes a threaded tip. The tip may be placed into position to prevent rotation of the barb. It is often time consuming to remove the tip to release the fish from an arrow shaft or spear shaft.

SUMMARY OF THE INVENTION

A fish harvesting head is disclosed having one or more barb arms protruding from barb receiving slots in a harvesting body and having an arm retraction system configured to withdraw the barb arms toward the harvesting body for removal of the fish harvesting head from a body, which may be, but is not limited to being, a fish, alligator, or the like, is disclosed. The arm retraction system is configured to allow the barb arms to move between a shooting barb position and a fish retaining barb position. The arm retraction system may also be activated to retain the barb arms partially within the harvesting body of the fish harvesting head in a fish harvesting head release position, which enables the fish harvesting head to be easily pulled back through a body, such as a fish, after it has been shot. The barb arms may be held in the fish harvesting head release position while all components, including a distal pierce tip, remain attached to the fish harvesting head, thereby reducing, if not eliminating, the likelihood of losing the tip or other components of the fish harvesting head.

These and other embodiments are described in more detail below.

BRIEF DESCRIPTION OF THE DRAWINGS

The accompanying drawings, which are incorporated in and form a part of the specification, illustrate embodiments of the presently disclosed invention and, together with the description, disclose the principles of the invention.

DETAILED DESCRIPTION OF THE INVENTION

Figure 3:
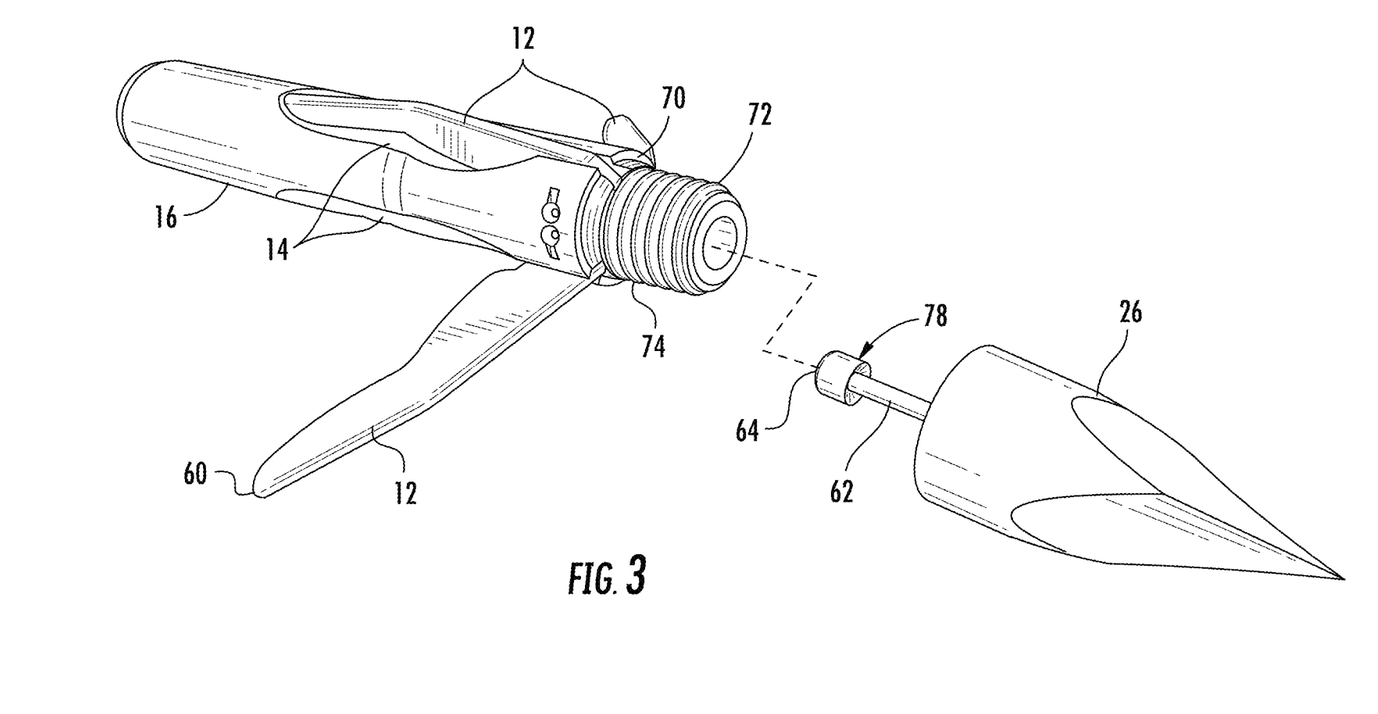
FIG. 3 is another exploded perspective view of the fish harvesting head shown in FIG. 1 in which the distal pierce tip is not aligned with the longitudinal axis of the harvesting body.
Figure 4:
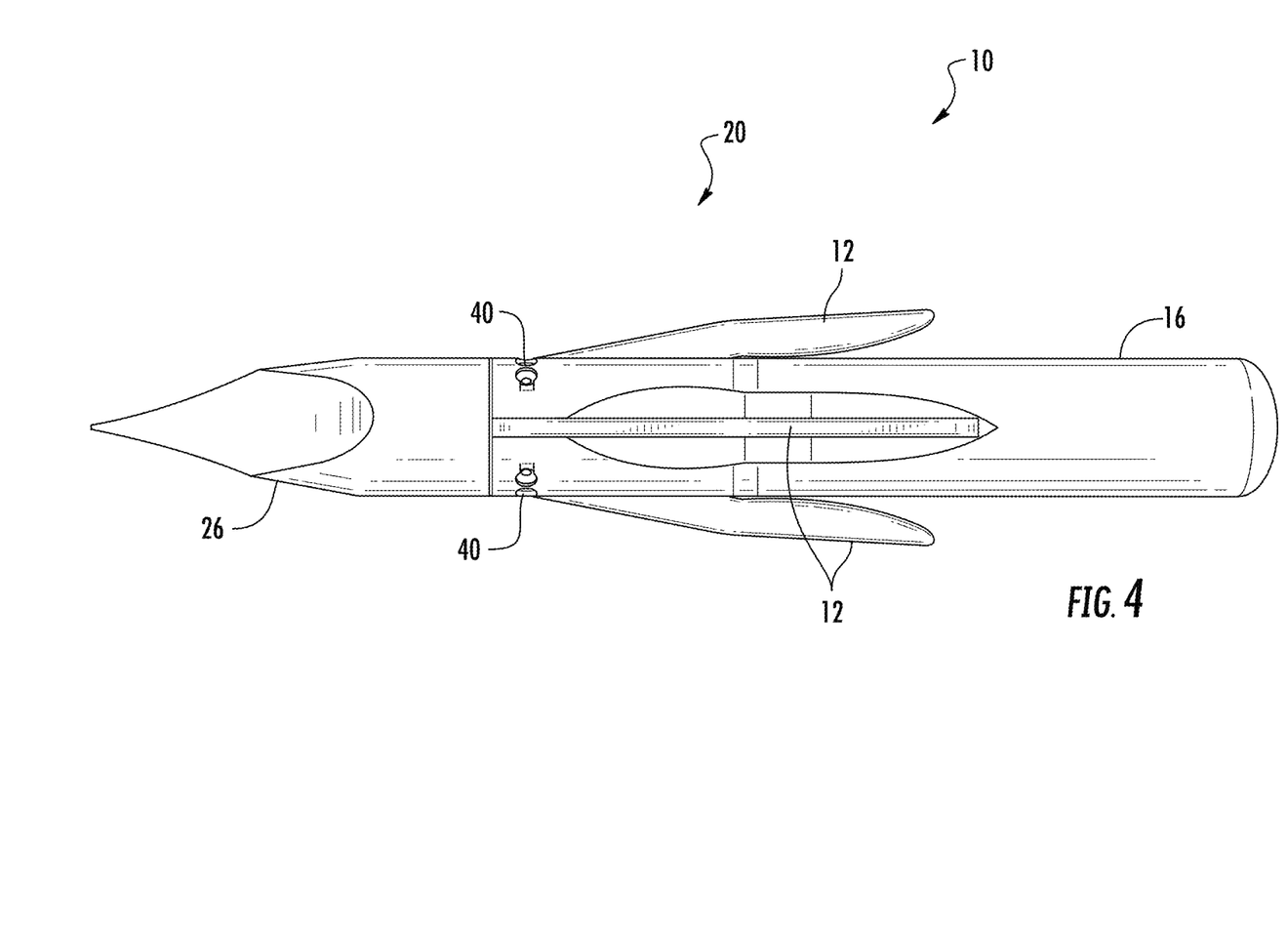
FIG. 4 is a side view of the fish harvesting head in a shooting barb position.
Figure 5:
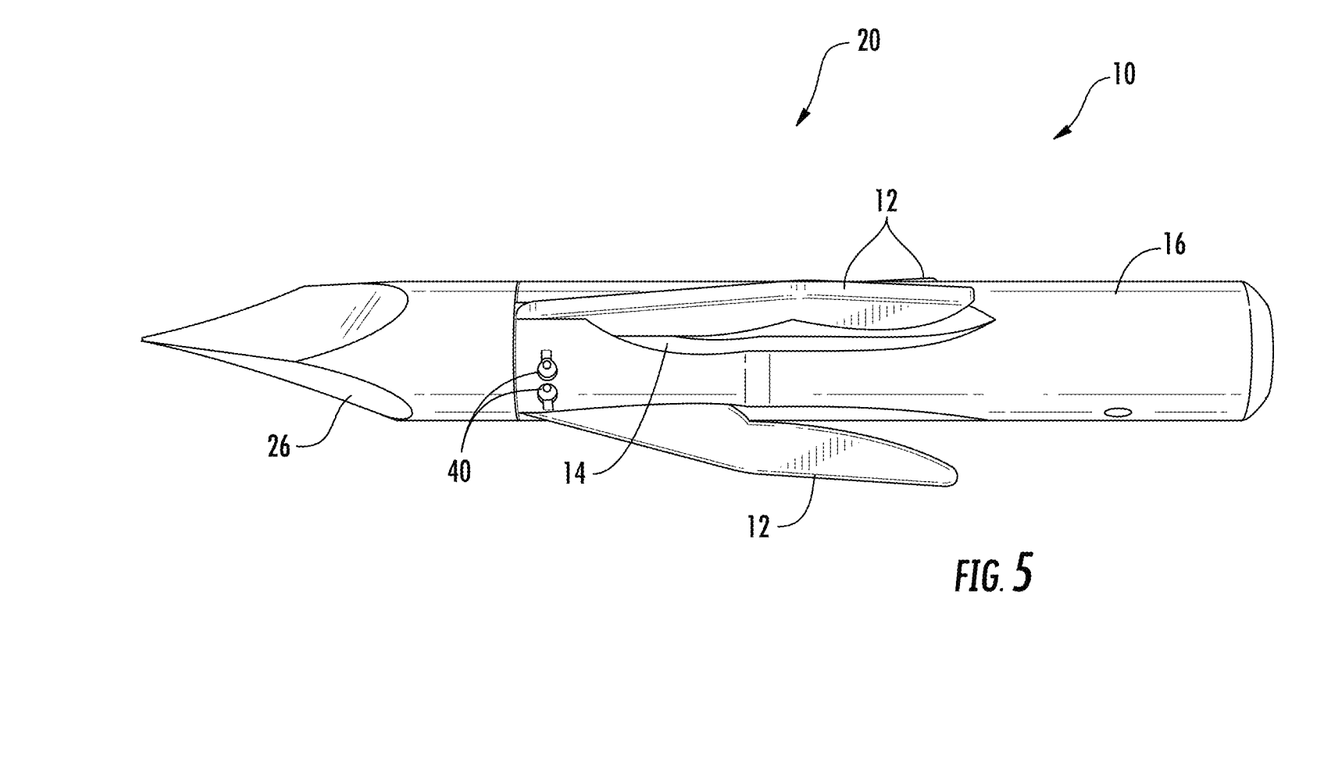
FIG. 5 is another side view of the fish harvesting head in the shooting barb position.
Figure 6:
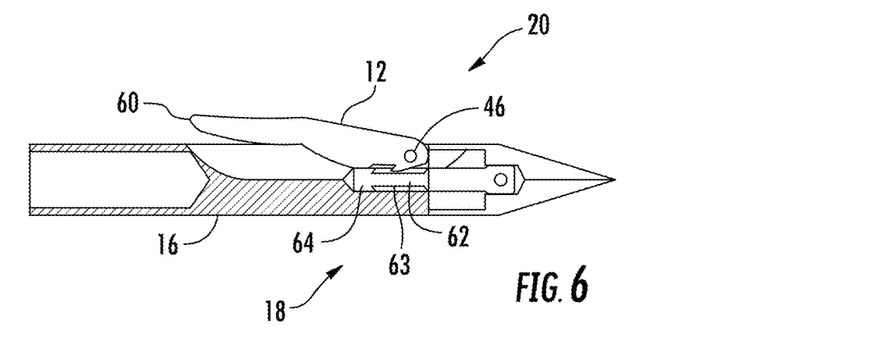
FIG. 6 is a multilayer, cross-sectional side view of the fish harvesting head in the shooting barb position.
Figure 7:
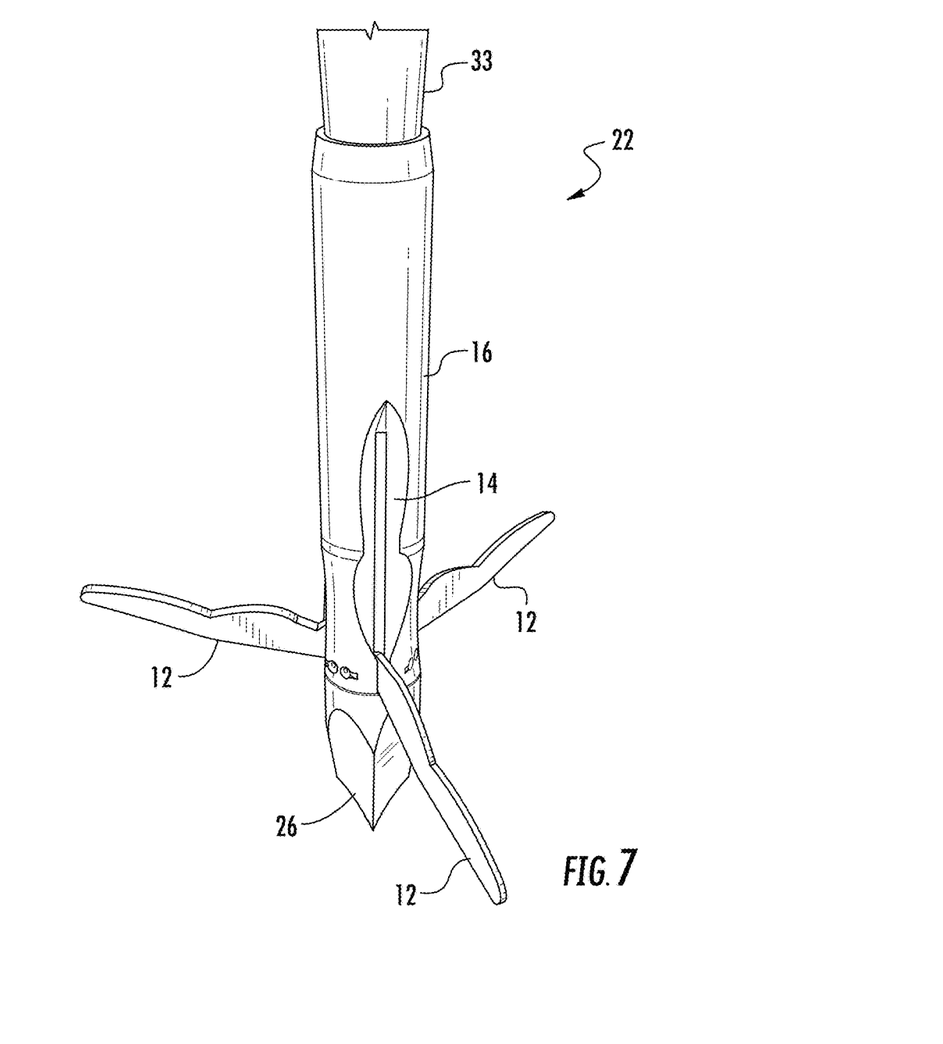
FIG. 7 is a perspective view of the fish harvesting head in a fish retaining barb position.
Figure 8:
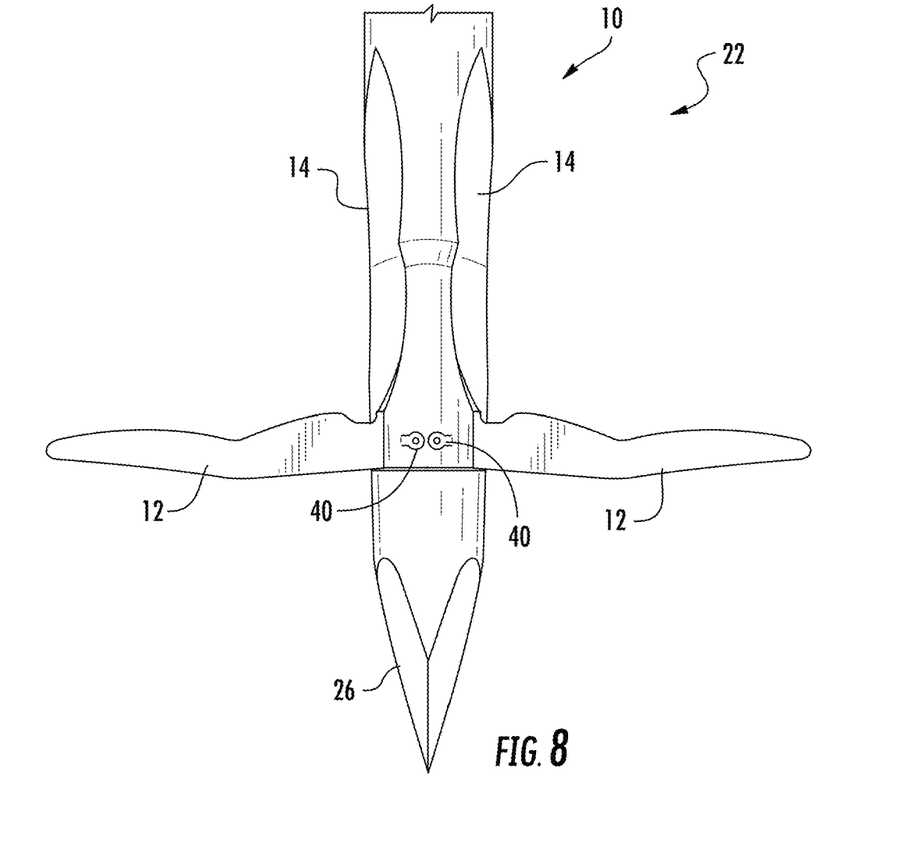
FIG. 8 is a side view of the fish harvesting head in the fish retaining barb position.
Figure 9:
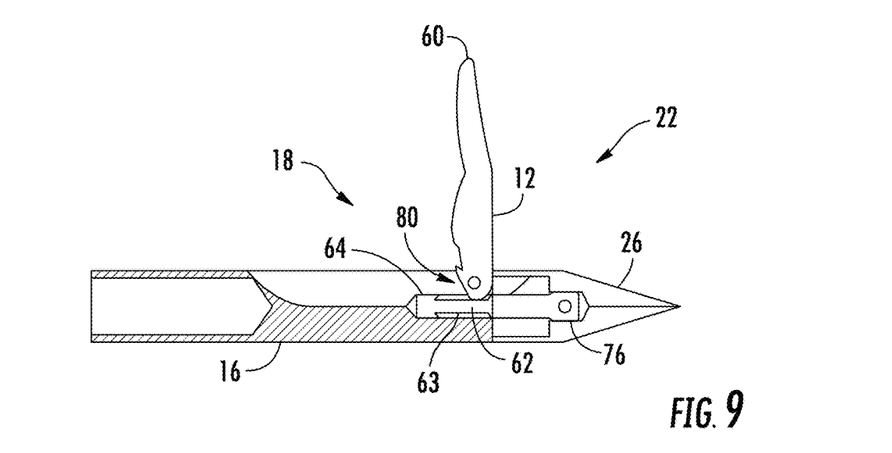
FIG. 9 is a multilayer, cross-sectional side view of the fish harvesting head in the fish retaining barb position.
Figure 10:
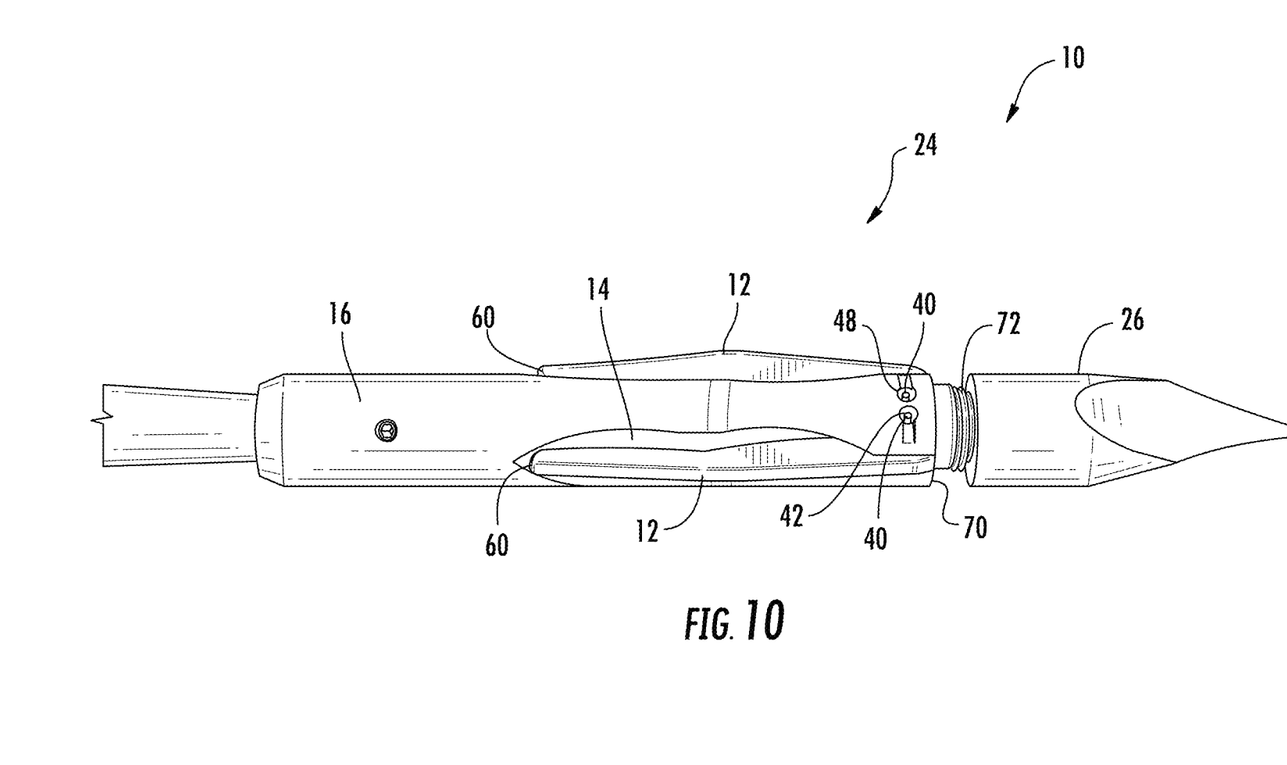
FIG. 10 is a side view of the fish harvesting head in the fish harvesting head release position.
Figure 11:
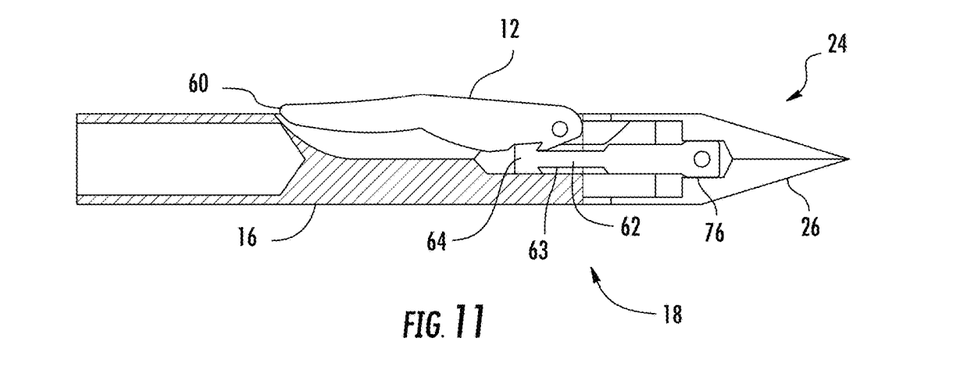
FIG. 11 is a multilayer, cross-sectional side view of the fish harvesting head in the fish harvesting head release position.

As shown in FIGS. 1-19, a fish harvesting head 10 is disclosed having one or more barb arms 12 protruding from barb receiving slots 14 in a harvesting body 16 and having an arm retraction system 18 configured to withdraw the barb arms 12 toward the harvesting body 16 for removal of the fish harvesting head 10 from a body is disclosed. The arm retraction system 18 may be configured to allow the barb arms 12 to move between a shooting barb position 20, as shown in FIGS. 4-6, and a fish retaining barb position 22, as shown in FIGS. 7-9. The arm retraction system 18 may also be activated to retain the barb arms 12 partially within the harvesting body 16 of the fish harvesting head 10 in a fish harvesting head release position 24, as shown in FIGS. 10 and 11, which enables the fish harvesting head 10 to be easily pulled back through a body, such as a fish, after it has been shot. The barb arms 12 may be held in the fish harvesting head release position while all components, including a distal pierce tip 26, remain attached to the fish harvesting head 10, thereby reducing, if not eliminating, the likelihood of losing the tip 26 or other components of the fish harvesting head 10.

In at least one embodiment, the fish harvesting head 10 may include a harvesting body 16 having a forward portion 28 and a rear portion 30, wherein the rear portion 30 includes a rear connection device 32 for attachment to a shaft 33. The shaft 33 may be, but is not limited to being, an arrow shaft, a spearfishing shaft or a harpoon shaft. The rear portion 30 may include a releasable connection system for releasably connecting the rear portion fish harvesting head 10 to a shaft 33. The releasably connection system may be any appropriate system, such as, but not limited to, threads.

The fish harvesting head 10 may also include one or more barb receiving slots 14 positioned in the forward portion 28 of the harvesting body 16. In other embodiments, one or more barb receiving slots 14 may extend into the rear portion 30. The barb receiving slot 14 may extend along the harvesting body 16 and may include an opening 34 in an outer surface 36 of the harvesting body 16 through which a portion of a barb arm 12 protrudes. The barb receiving slot 14 may have a width that is larger than a width of the barb arm 12. In at least one embodiment, the barb receiving slot 14 may be scalloped on either side, or both sides of the barb arm 12. Such configuration enables the barb arm 12 to be pushed into the fish harvesting head release position 24 where the barb arm 12 is withdrawn to the harvesting body 16 even if there is debris, tissue or the like in the barb receiving slot 14. As the barb arm 12 is withdrawn into the barb receiving slot 14, the debris and tissue are forced from the barb receiving slot 14 into the scalloped areas on each side of the barb receiving slot 14. The curved surfaces forming the barb receiving slot 14 do not retain debris and tissue, but allow the debris and tissue to be pushed out of the barb receiving slot 14.

Figure 1:
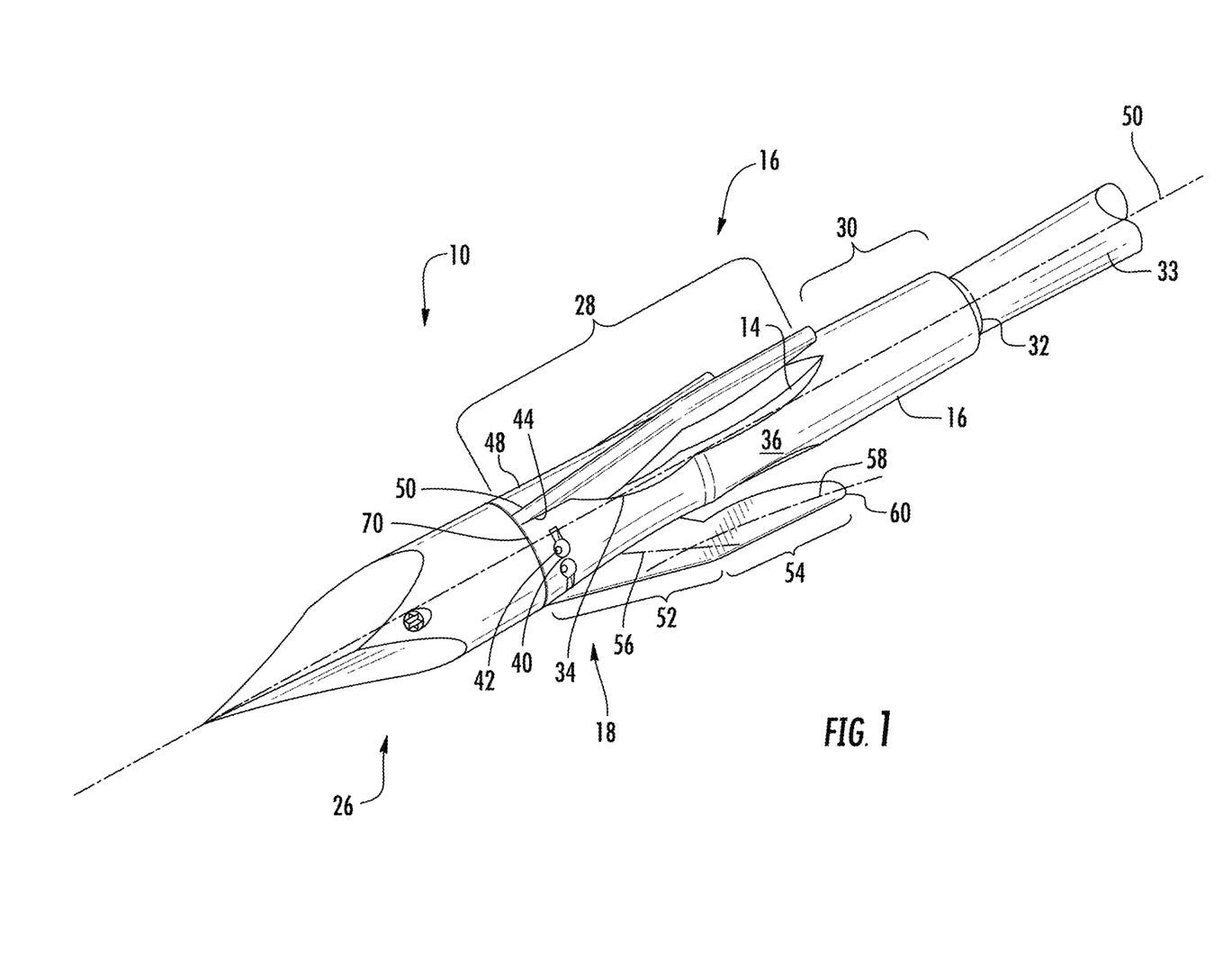
FIG. 1 is a perspective view of the fish harvesting head in a shooting barb position.
Figure 16:
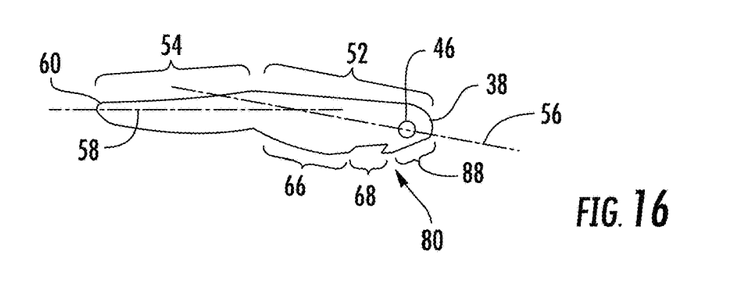
FIG. 16 is a side view of the barb arm.
Figure 17:
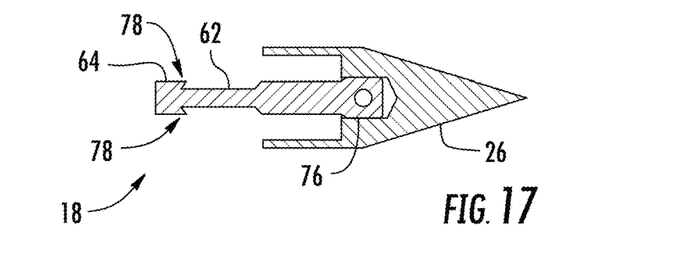
FIG. 17 is a cross-sectional side view of the barb position control shaft positioned in the distal pierce tip.

The fish harvesting head 10 may include one or more barb arms 12 protruding from at least one barb receiving slot 14, and in at least one embodiment, protruding from each barb receiving slot 14. The barb arm 12 may have one or more inner ends 38, as shown in FIG. 16, attached to the harvesting body 16 in the barb receiving slot 14, as shown in FIG. 1, via at least one connector 40 extending from a first receiver 42 in a first side 44 of the barb receiving slot 14, through an orifice 46 in the barb arm 12, and into a second receiver 48 in a second side 50 of the barb receiving slot 14. The barb arm 12 may pivot between a shooting barb position 20, as shown in FIG. 4-6, where the barb arms 12 may be between about 5 degrees and 20 degrees relative to a longitudinal axis 50 of the harvesting body 16 and a fish retaining barb position 22, as shown in FIGS. 7-9, that may be generally orthogonal to the longitudinal axis 50 of the harvesting body 16.

The barb arms 12 may have any appropriate configuration enabling the arms 12 from moving between the shooting barb position 20 to the fish retaining barb position 22. In at least one embodiment, the barb arm 12 may have an inner section 52 with the orifice 46 usable to attach the barb arm to the harvesting body 16 and an outer section 54 extending outwardly from a distal end of the inner section 52. The inner section 52 and outer section 54 may have longitudinal axes 56, 58, respectively, that are nonparallel. In at least one embodiment, the longitudinal axis 58 of the outer section 54 may be offset between about two degrees and about twenty degrees. The barb arms 12 may be separated by about 120 degrees about the longitudinal axis 50 of the harvesting body 16.

The fish harvesting head 10 may include one or more arm retraction systems 18 configured to withdraw the barb arm 12 toward the harvesting body 16 for removal of the fish harvesting head 10 from a body. In at least one embodiment, the arm retraction system 18 may be configured to withdraw the barb arm 12 at least partially into the harvesting body 16 for removal of the fish harvesting head 10 from a body. The arm retraction system 18 may be configured to withdraw at least one half of the barb arm 12 in retained within the barb receiving slot 14. In another embodiment, the arm retraction system 18 may be configured to withdraw a distal tip of the barb arm 60 within 0.05 inch of the outer surface of the harvesting body 16. In certain embodiments, the arm retraction system 18 may be configured to withdraw a distal tip 60 of the barb arm 12 at least partially within the barb receiving slot 14.

The arm retraction system 18 may also include a barb position control shaft 62 positioned within a cavity 63 in the harvesting body 16, as shown in FIGS. 6, 9 and 11, a barb engaging device 64 in communication with the barb position control shaft 62, as shown in FIGS. 6, 9 and 11, a deployable edge region 66 of the barb arm 12 and a withdrawal edge region 68 of the barb arm 12, as shown in FIG. 16, wherein the barb engaging device 64 contacts the withdrawal edge 68 of the barb arm 12 to withdraw the barb arm 12 toward the harvesting body 16. The barb engaging device 64 may contact the withdrawal edge 68 of the barb arm 12 to withdraw the barb arm 12 toward the harvesting body 16 via axial movement of the barb engaging device 64 against the withdrawal edge 68 of the barb arm 12.

Figure 2:
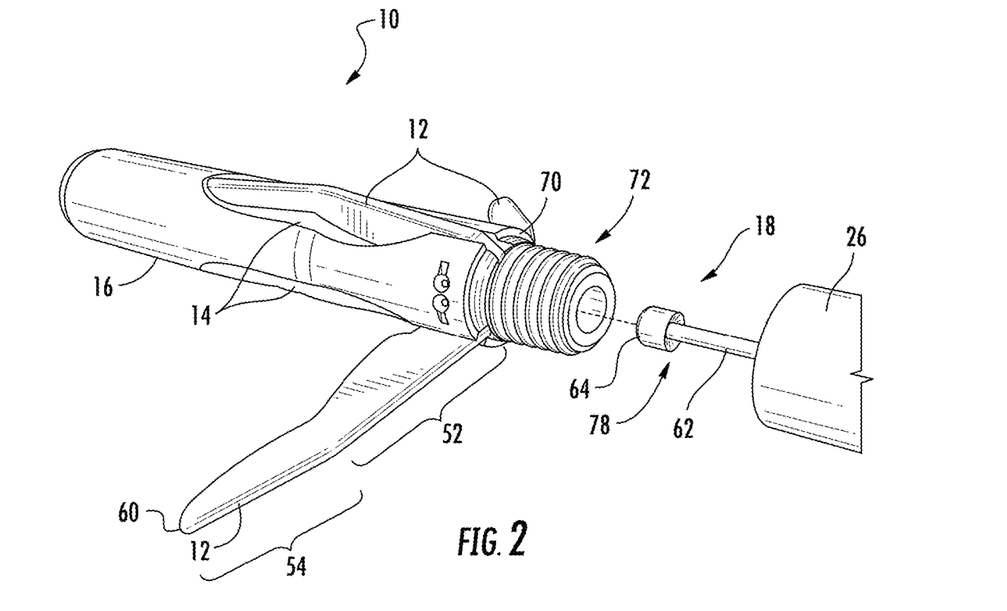
FIG. 2 is an exploded perspective view of the fish harvesting head shown in FIG. 1.
Figure 18:
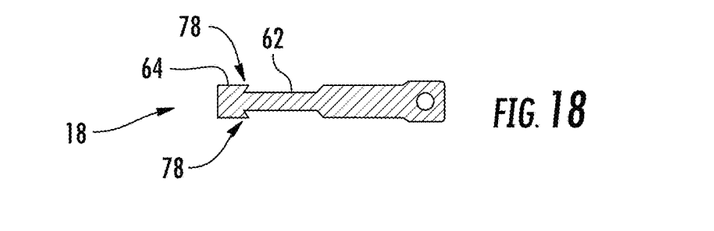
FIG. 18 is a cross-sectional side view of the barb position control shaft.
Figure 19:
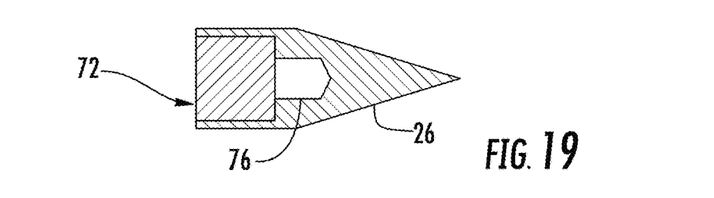
FIG. 19 is a cross-sectional side view of the distal pierce tip.

The fish harvesting head 10 may include one or more distal piercing tips 26 releasably attached to a distal end 70 of the harvesting body 16. The distal piercing tip 26 may prevent rotation of the barb arms 12 forward beyond a generally orthogonal position relative to the longitudinal axis 50 of the harvesting body 16. The barb position control shaft 62 may extend proximally from the distal piercing tip 26 such that axial movement of the distal piercing tip 26 moves the barb position control shaft 62 and barb engaging device 64. The fish harvesting head 10 may include a releasable connection device 72, as shown in FIGS. 2 and 3, for removably securing the distal piercing tip to the harvesting body 16. In one embodiment, the releasable connection device 72 for removably securing the distal piercing tip 26 to the harvesting body 16 comprises at least one thread configured to threadably secure the distal piercing tip 26 to the harvesting body 16 and configured to enable axial movement of the barb position control shaft 62. The distal pierce tip 26 may include a shaft receiving chamber 76, as shown in FIGS. 16 and 18, for receiving a portion of the barb position control shaft 62 to attach the barb position control shaft 62 to the distal pierce tip 26. The barb position control shaft 62 may be attached to the distal pierce tip 26 in any appropriate means, such as, but not limited to, a slotted spring pin, a roll pin or a weldment.

The fish harvesting head 10 may include one or more tip retainers 74, as shown in FIG. 3, positioned for preventing the distal pierce tip 26 from being unintentionally released from the harvesting body 16. In at least one embodiment, the tip retainer 74 may be, but is not limited to being, a piece of surgical tubing. The tip retainer 74 may be placed over the barb position control shaft 62 such that the tip retainer 74 is between the harvesting body 16 and the distal pierce tip 26 to prevent the distal pierce tip 26 from becoming loose, such as by vibrating loose.

When a barb arm 12 is positioned in a full retracted position, the fish harvesting head release position 24, with the barb arm 12 withdrawn towards the harvesting body 16, the deployable edge 66 of the barb arm 12 may be positioned closer to a longitudinal axis 50 of the harvesting body 16 than the withdrawal edge 68 of the barb arm 12. The withdrawal edge 68 of the barb arm 12 may be recessed into the harvesting body 16 further than the deployable edge 66 of the barb arm 12. The barb engaging device 64 may be attached to the barb position control shaft 62 such that the barb engaging device 64 includes a barb 78 configured to contact at least a portion of the withdrawal edge 68 of the barb arm 12. The barb engaging device 64 may be attached to the barb position control shaft 62 such that the barb engaging device 64 includes a barb 78 that is sized to mesh with a barb 80 at the withdrawal edge 68 of the barb arm 12. The barb 78 of the barb engaging device 64 may extend around the barb position control shaft 62. As shown in FIGS. 1-3 and 7, the barb arm 12 may include a plurality of barb arms 12, each positioned within a barb receiving slot 12 and each barb 80 including a withdrawal edge 68 configured to mate with the barb 78 of the barb engaging device 64 on the barb position control shaft 62.

Figure 12:
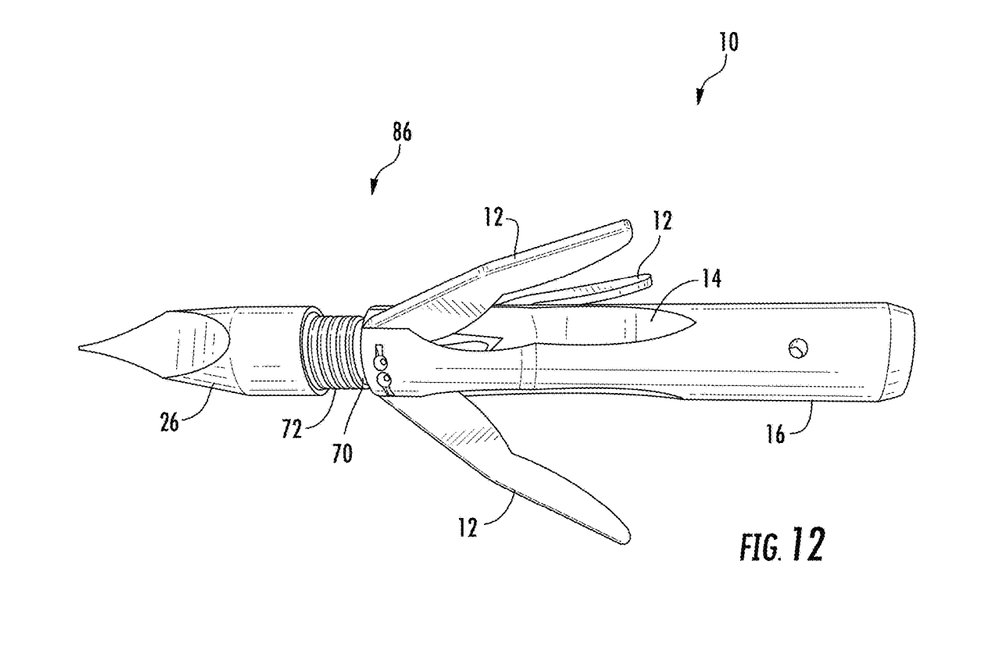
FIG. 12 is a perspective view of the fish harvesting head in an assembly/disassembly position.
Figure 13:
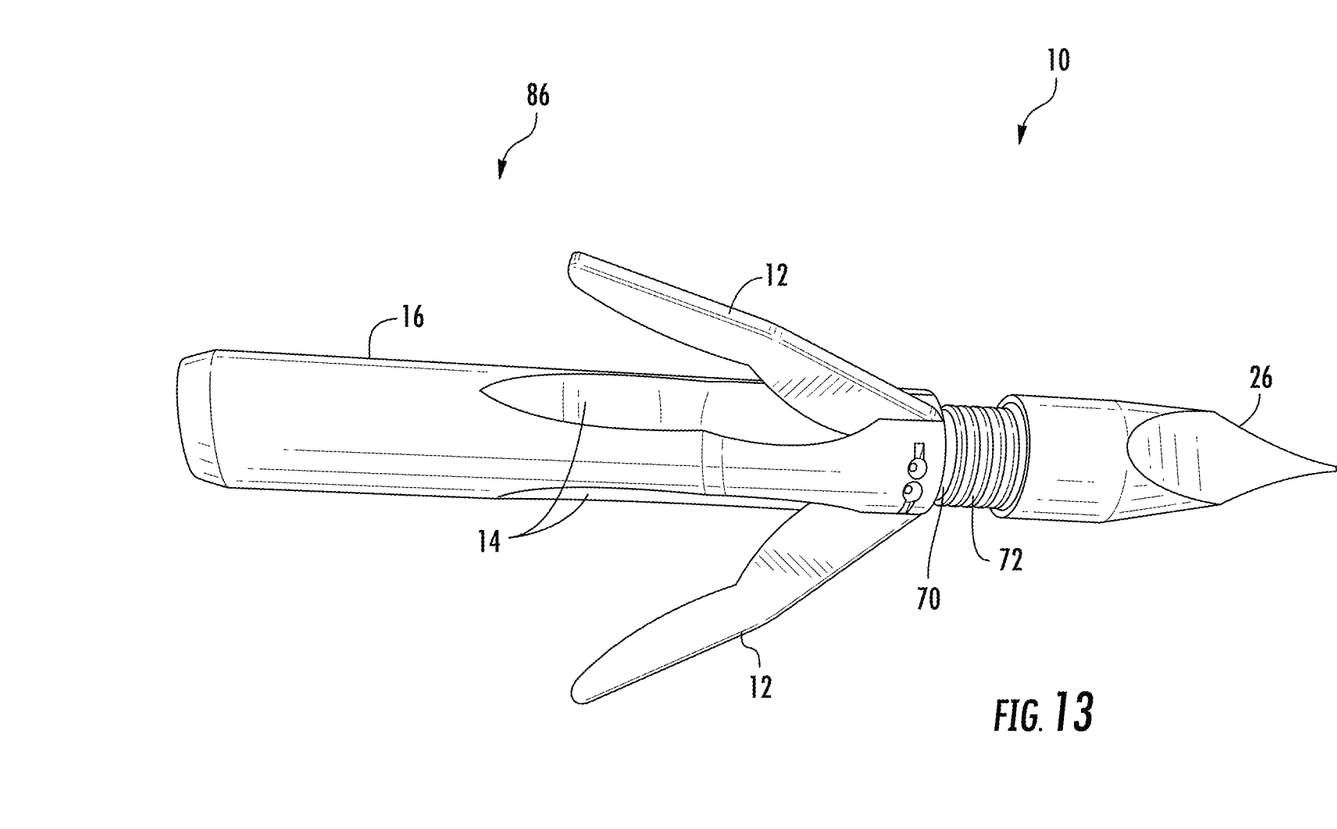
FIG. 13 is another perspective view of the fish harvesting head in the assembly/disassembly position.

The fish harvesting head 10 may be placed into an assembly/disassembly position 86, as shown in FIGS. 12 and 13, in which the barb position control shaft 62 together with the barb engaging device 64 attached to an end of the barb position control shaft 62 may be inserted into the harvesting body 16 and past the location at which the barb arms 12 are attached to the barb position control shaft 62. The barb arms 12 may include an arm retraction assembly region 88 configured to enable the barb engaging device 64 attached to an end of the barb position control shaft 62 to be inserted into the harvesting body 16 and past the location at which the barb arms 12 are attached to the barb position control shaft 62. In at least one embodiment, as shown in FIG. 16, the arm retraction assembly region 88 may be formed from a linear edge positioned radially inward of the orifice 46 in the barb arm 12. The barb position control shaft 62 together with the barb engaging device 64 attached to an end of the barb position control shaft 62 may be removed from the harvesting body 16 and past the location at which the barb arms 12 are attached to the barb position control shaft 62 by placing each of the barb arms 12 in an assembly/disassembly position 86, as shown in FIGS. 12 and 13, which places the linear edge of the arm retraction assembly region 88 generally parallel with the longitudinal axis 50 of the harvesting body 16.

Figure 14:
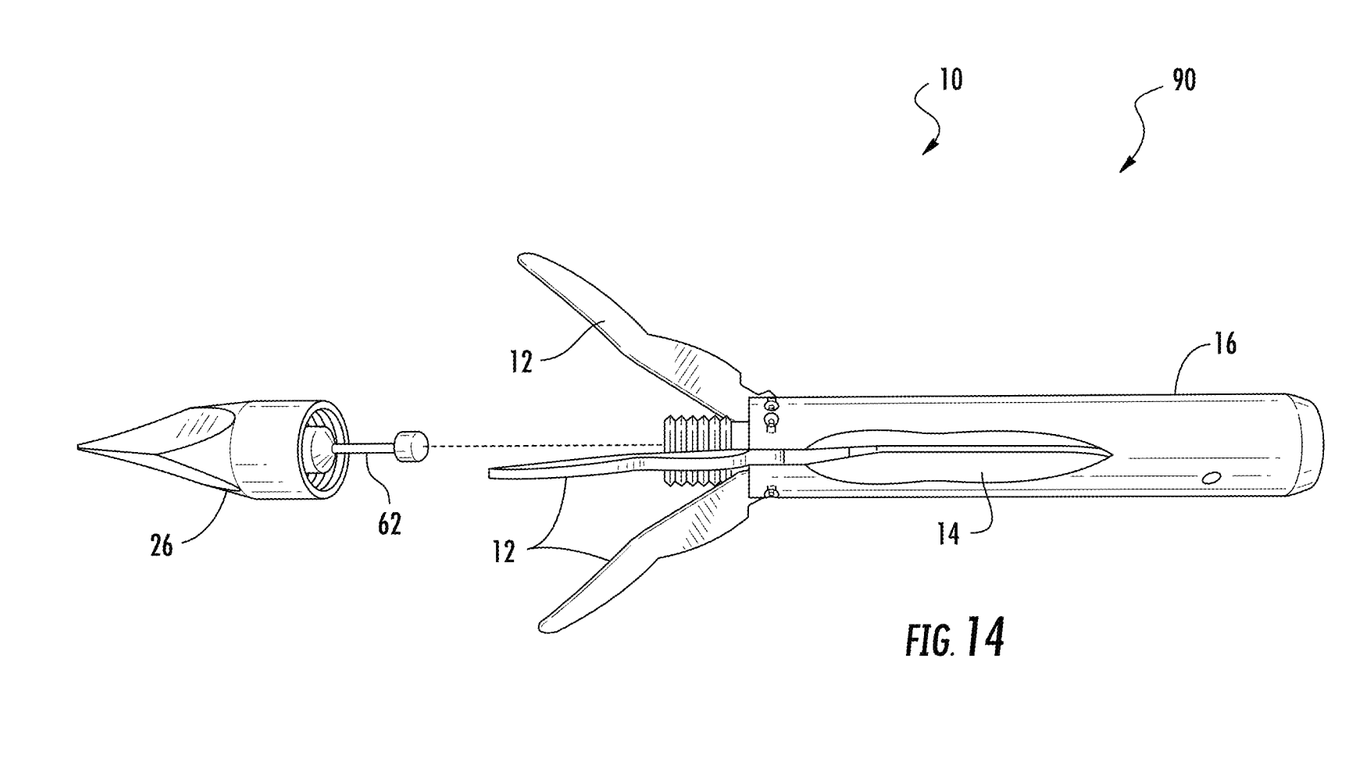
FIG. 14 is a perspective view of the fish harvesting head in a backup withdrawal position.
Figure 15:
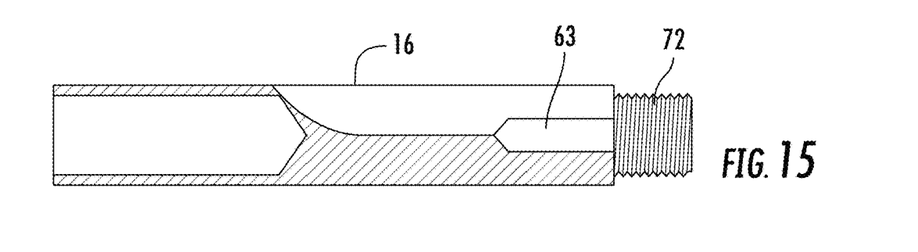
FIG. 15 is a multilayer, cross-sectional side view of the harvesting body.

The fish harvesting head 10 may be placed into a backup withdrawal position 90, as shown in FIG. 14, such that the fish harvesting head 10 may be removed from a body, such as a fish, alligator, target, or other material or tissue in situations where the barb arms 12 cannot be placed in the fish harvesting head release position 24. As shown in FIG. 14, the distal pierce tip 26 may be removed from the harvesting body 16, thereby enabling the barb arms 12 to be rotated past an orthogonal position to form an obtuse angle with the longitudinal axis 50 of the harvesting body 16. Such obtuse angle of the barb arms 12 enables the fish harvesting head 10 to be removed from a body.

The foregoing is provided for purposes of illustrating, explaining, and describing embodiments of this invention. Modifications and adaptations to these embodiments will be apparent to those skilled in the art and may be made without departing from the scope or spirit of this invention.

I claim:

1. A fish harvesting head, comprising:
   a harvesting body having a forward portion and a rear portion, wherein the rear portion includes a rear connection device for attachment to a shaft;
   at least one barb receiving slot positioned in the harvesting body, wherein the at least one barb receiving slot extends along the harvesting body and includes an opening in an outer surface of the harvesting body through which a portion of a barb arm protrudes;
   at least one barb arm protruding from at least one barb receiving slot;
   where at least one of the barb arms has at least one inner end attached to the harvesting body in the at least one barb receiving slot via at least one connector extending from a first receiver in a first side of the at least one barb receiving slot, through an orifice in the barb arm, and into a second receiver in a second side of the at least one barb receiving slot;
   an arm retraction system configured to withdraw the at least one barb arm toward the harvesting body for removal of the fish harvesting head from a the harvesting body.

2. The fish harvesting head of claim 1, wherein the arm retraction system is configured to withdraw at least one half of the at least one barb arm within the at least one barb receiving slot.

3. The fish harvesting head of claim 1, wherein the arm retraction system is configured to withdraw a distal tip of the at least one barb arm within 0.05 inch of the outer surface of the harvesting body.

4. The fish harvesting head of claim 1, wherein the arm retraction system is configured to withdraw a distal tip of the at least one barb arm at least partially within the at least one barb receiving slot.

5. The fish harvesting head of claim 1, wherein the arm retraction system further comprises a barb position control shaft positioned within a cavity in the harvesting body, a barb engaging device in communication with the barb position control shaft, a deployable edge region of the at least one barb arm and a withdrawal edge region of the at least one barb arm, wherein the barb engaging device contacts the withdrawal edge of the at least one barb arm to withdraw the at least one barb arm toward the harvesting body.

6. The fish harvesting head of claim 5, wherein the barb engaging device contacts the withdrawal edge of the at least one barb arm to withdraw the at least one barb arm toward the harvesting body via axial movement of the barb engaging device against the withdrawal edge of the at least one barb arm.

7. The fish harvesting head of claim 6, further comprising a distal piercing tip releasably attached to a distal end of the harvesting body, wherein the barb position control shaft extends proximally from the distal piercing tip such that axial movement of the distal piercing tip moves the barb position control shaft and barb engaging device.

8. The fish harvesting head of claim 7, further comprising a releasable connection device for removably securing the distal piercing tip to the harvesting body.

9. The fish harvesting head of claim 8, wherein the releasable connection device for removably securing the distal piercing tip to the harvesting body comprises at least one thread configured to threadably secure the distal piercing tip to the harvesting body and configured to enable axial movement of the barb position control shaft.

10. The fish harvesting head of claim 9, further comprising a tip retainer positioned for preventing the distal pierce tip from being unintentionally released from the harvesting body.

11. The fish harvesting head of claim 7, wherein the distal pierce tip includes a shaft receiving chamber for receiving a portion of the barb position control shaft to attach the barb position control shaft to the distal pierce tip.

12. The fish harvesting head of claim 5, wherein, when the at least on barb arm is positioned in a full retracted position with the at least one barb arm withdrawn towards the harvesting body, the deployable edge of the at least one barb arm is positioned closer to a longitudinal axis of the harvesting body than the withdrawal edge of the at least one barb arm.

13. The fish harvesting head of claim 5, wherein the withdrawal edge of the at least one barb arm is recessed into the harvesting body further than the deployable edge of the at least one barb arm.

14. The fish harvesting head of claim 5, wherein the barb engaging device is attached to the barb position control shaft such that the barb engaging device includes a barb configured to contact at least a portion of the withdrawal edge of the at least one barb arm.

15. The fish harvesting head of claim 5, wherein the barb engaging device is attached to the barb position control shaft such that the barb engaging device includes a barb that is sized to mesh with a barb at the withdrawal edge of the at least one barb arm.

16. The fish harvesting head of claim 15, wherein the barb of the barb engaging device extends around the barb position control shaft.

17. The fish harvesting head of claim 16, wherein the at least one barb arm comprises a plurality of barb arms, each positioned within a barb receiving slot and each barb arm including a withdrawal edge configured to mate with the barb of the barb engaging device on the barb position control shaft.

18. A fish harvesting head, comprising:
- a harvesting body having a forward portion and a rear portion, wherein the rear portion includes a rear connection device for attachment to a shaft;
- at least one barb receiving slot positioned in the harvesting body, wherein the at least one barb receiving slot extends along the harvesting body and includes an opening in an outer surface of the harvesting body through which a portion of a barb arm protrudes;
- at least one barb arm protruding from at least one barb receiving slot;
- where at least one of the barb arms has at least one inner end attached to the harvesting body in the at least one barb receiving slot via at least one connector extending from a first receiver in a first side of the at least one barb receiving slot, through an orifice in the barb arm, and into a second receiver in a second side of the at least one barb receiving slot;
- an arm retraction system configured to withdraw the at least one barb arm toward the harvesting body for removal of the fish harvesting head from a the harvesting body;
- wherein the arm retraction system is configured to withdraw a distal tip of the at least one barb arm at least partially within the at least one barb receiving slot; and
- a distal piercing tip releasably attached to a distal end of the harvesting body, wherein the barb position control shaft extends proximally from the distal piercing tip such that axial movement of the distal piercing tip moves the barb position control shaft and barb engaging device.

19. The fish harvesting head of claim 18, wherein, when the at least on barb arm is positioned in a full retracted position with the at least one barb arm withdrawn towards the harvesting body, the deployable edge of the at least one barb arm is positioned closer to a longitudinal axis of the harvesting body than the withdrawal edge of the at least one barb arm.

20. A fish harvesting head, comprising:
- a harvesting body having a forward portion and a rear portion, wherein the rear portion includes a rear connection device for attachment to a shaft;
- at least one barb receiving slot positioned in the harvesting body, wherein the at least one barb receiving slot extends along the harvesting body and includes an opening in an outer surface of the harvesting body through which a portion of a barb arm protrudes;
- at least one barb arm protruding from at least one barb receiving slot;
- where at least one of the barb arms has at least one inner end attached to the harvesting body in the at least one barb receiving slot via at least one connector extending from a first receiver in a first side of the at least one barb receiving slot, through an orifice in the barb arm, and into a second receiver in a second side of the at least one barb receiving slot;
- an arm retraction system configured to withdraw the at least one barb arm toward the harvesting body for removal of the fish harvesting head from a the harvesting body;
- wherein the arm retraction system is configured to withdraw a distal tip of the at least one barb arm at least partially within the at least one barb receiving slot; and
- wherein the arm retraction system further comprises a barb position control shaft positioned within a cavity in the harvesting body, a barb engaging device in communication with the barb position control shaft, a deployable edge region of the at least one barb arm and a withdrawal edge region of the at least one barb arm, wherein the barb engaging device contacts the withdrawal edge of the at least one barb arm to withdraw the at least one barb arm toward the harvesting body.

* * * * *